US005238232A

United States Patent [19]
Kobayashi et al.

[11] Patent Number: 5,238,232
[45] Date of Patent: Aug. 24, 1993

[54] SELF-EXPANDING MOUNT

[75] Inventors: Toshiaki Kobayashi; Koji Okazaki; Yasuji Nozawa, all of Wako, Japan

[73] Assignee: Honda Giken Kogyo Kabushiki Kaisha, Tokyo, Japan

[21] Appl. No.: 958,308

[22] Filed: Oct. 8, 1992

[30] Foreign Application Priority Data

Oct. 9, 1991 [JP] Japan .................................. 3-290641

[51] Int. Cl.$^5$ ............................................ F16M 13/00
[52] U.S. Cl. ................................. 267/140.14; 188/267; 188/378; 248/550; 267/136; 267/122; 267/219
[58] Field of Search ...................... 267/140.14, 140.15, 267/122, 140.11, 140.13, 219, 220, 136; 188/267, 378, 379, 380; 180/300, 312, 902; 248/550, 562, 636, 638; 280/707

[56] References Cited

U.S. PATENT DOCUMENTS 4,638,983 1/1987 Idigkeit et al. .
4,650,170 3/1987 Fukushima ...................... 267/140.14

FOREIGN PATENT DOCUMENTS

0283880 9/1988 European Pat. Off. .
0347666 12/1989 European Pat. Off. .
3901737 7/1990 Fed. Rep. of Germany .
4110601 10/1991 Fed. Rep. of Germany .
60-8540 1/1985 Japan .

Primary Examiner—Douglas C. Butler
Attorney, Agent, or Firm—Lyon & Lyon

[57] ABSTRACT

A self-expanding mount controls transmission of vibration of a vibration source to a base. A main liquid chamber is defined between a resilient member fixed to the vibration source or the base and a casing fixed to the base or the vibration source. A metallic bellows is driven in response to a first control signal corresponding to vibration of the vibration source, to cause a variation in the pressure of liquid within the main liquid chamber. This variation in the liquid pressure causes contraction and expansion of the resilient member to thereby control the transmission of vibration of the vibration source to the base. A magnetostrictive element is resiliently deformed in response to a second control signal corresponding to the vibration of the vibration source, to change spacing between the vibration source and the base.

10 Claims, 8 Drawing Sheets

SELF-EXPANDING MOUNT

BACKGROUND OF THE INVENTION

1. Field of the Invention

This invention relates to a self-expanding mount for supporting a vibration source, such as an engine, on a base such as the chassis of a vehicle, and more particularly to a self-expanding mount of this kind, which has a liquid chamber filled with liquid, the pressure of which is varied in response to vibration transmitted from the vibration source to cause contraction and expansion of a resilient member thereof fixed to the vibration source, to thereby control transmission of the vibration to the base.

2. Prior Art

Conventionally, self-expanding mounts of this kind, which are so-called active mounts, have been proposed e.g. by Japanese Provisional Patent Publication Kokai) No. 60-8540 and U.S. Pat. No. 4,638,983.

The former discloses a vibration-absorbing device comprising a fluid chamber provided between a vibrating body or engine and a vibrated body or chassis of a vehicle, which is filled with fluid and adapted to expand and contract in response to vibration transmitted from the vibrating body, and pulsating pressure-generating means which imparts pulsating pressure to the fluid within the fluid chamber in opposite phase to a pulsation caused by the vibration transmitted from the vibrating body to thereby prevent transmission of vibration from the vibrating body to the vibrated body, wherein the pulsating pressure-generating means is comprised of a vibrating element which is formed of a generally flat plate made of a magnetic material and forming part of walls defining the fluid chamber, the vibrating element being capable of vibrating to thereby impart pulsation to the fluid within the fluid chamber, and a pair of solenoids which, when energized, cause vibration of the vibrating element. In the proposed vibration-absorbing device, the vibrating element in the form of a generally flat plate is vertically vibrated by an electromagnetic force generated by the solenoids to impart vibration to the fluid within the fluid chamber in opposite phase to pulsation caused by vibration of the engine, to thereby prevent the vibration of the engine from being transmitted to the chassis of a vehicle.

The latter discloses an apparatus for the resilient mounting of a vibrating body, including a mounting bracket and a pedestal which are interconnected through a resilient element that contains a liquid-filled hollow space (main liquid chamber), a compensating baffle associated with a positioning element being provided whose adjustment permits compensation of the pressure variations in the liquid caused by disturbing vibrations, wherein the compensating baffle faces the liquid-filled space, the positioning element is adapted to be actuated by a primary element which detects disturbing vibrations of the vibrating body, and the primary element and the positioning element are interconnected through a freely programmable control unit. Further, an equalizing space (auxiliary liquid chamber) is connected to the working space or liquid-filled space through a throttle opening. According to this prior art, when the liquid-filled space is compressed by downward movement of the engine, for example, the compensating baffle is displaced upward to thereby prevent vibration of the engine from being transmitted to the chassis or frame of a vehicle.

According to the former prior art, the solenoids are energized in response to vibration of the engine as a vibrating body, which causes vibration of the vibrating element in the form of a generally flat plate forming part of the fluid chamber to vary the pressure of the fluid within the fluid chamber, which in turn causes expansion and contraction of a resilient member fixed to the engine to thereby prevent vibration of the engine from being transmitted to the chassis of the vehicle. On the other hand, according to the latter prior art, when the primary element supplies an electrical signal to the control unit, the control unit processes the signal on the basis of the engine rotational speed or other parameters and supplies the processed signal to the positioning element to drive same, whereby the compensating baffle is displaced within the liquid-filled space, varying the pressure of the liquid therein, so that the resilient element fixed on the engine side is expanded and contracted to prevent the vibration of the engine from being transmitted to the chassis or frame of the vehicle.

Thus, according to the prior art devices described above, the vibrating element or the compensating baffle as a driven member is displaced within the liquid chamber to vary liquid pressure within the liquid chamber, which causes expansion and contraction of the resilient member defining the liquid chamber and fixed to the engine to thereby prevent the vibration of the engine from being transmitted to the chassis of the vehicle. Therefore, the both prior art devices suffer from a time lag between the time point current is supplied to the solenoids or the control signal is supplied to the positioning element and the time point the resilient member is actually expanded and contracted. The time lag lies within a range of 1 millisec. to several tens millisec., so that engine vibration components in a low frequency region can be absorbed to some extent, but engine vibration components in a high frequency region (e.g. higher than 100 Hz) cannot be absorbed, resulting in transmission of the engine vibration to the chassis of the vehicle.

SUMMARY OF THE INVENTION

It is the object of the invention to provide a self-expanding mount which is capable of effectively controlling transmission of vibration of an engine over a wide frequency range from a low frequency region to a high frequency region to the chassis of a vehicle.

To attain the above object, the present invention provides a self-expanding mount for controlling transmission of vibration of a vibration source to a base, including a resilient member fixed to one of the vibration source and the base, a casing fixed to the other of the vibration source and the base, a main liquid chamber defined between the resilient member and the casing and filled with liquid, liquid pressure-changing means for changing pressure of the liquid within the main liquid chamber in response to a first control signal corresponding to vibration of the vibration source, an auxiliary liquid chamber, and a communication passage having a restriction and communicating the auxiliary liquid chamber with the main liquid chamber, wherein variation in the pressure of the liquid caused by the liquid pressure-changing means causes contraction and expansion of the resilient member to thereby control the transmission of vibration of the vibration source to the base.

The self-expanding mount according to the invention is characterized by comprising spacing-changing means for changing spacing between the vibration source and the base, the spacing-changing means having an element resiliently deformable in response to a second control signal corresponding to the vibration of the vibration source.

In one preferred form of the invention, the spacing-changing means is interposed between the vibration source and the resilient member for changing spacing between the vibration source and the resilient member.

In another preferred form of the invention, the spacing-changing means is interposed between the base and the casing for changing spacing between the base and the casing.

Preferably, the self-expanding mount is disposed normally to the horizontal, and includes a plurality of the spacing-changing means, the spacing-changing means being arranged at horizontally different locations, each of the spacing-changing means being controlled by the second control signal separately and independently of each other.

Preferably, the element is a magnetostrictive element.

More preferably, the spacing-changing means includes a coil disposed to be supplied with a current as the second control signal, the coil generating a magnetic field when energized by the current.

Further preferably, the spacing-changing means includes a permanent magnet which permanently deforms the magnetostrictive element.

Alternatively, the element is an electrostrictive element.

Preferably, the element is resiliently deformed by the second control signal at a frequency higher than a frequency at which the pressure of the liquid is varied in response to the first control signal.

Specifically, the element contracts and expands in response to the second control signal.

The above and other objects, features, and advantages of the invention will become more apparent from the ensuing detailed description taken in conjunction with the accompanying drawings.

DETAILED DESCRIPTION

The invention will now be described with reference to the drawings showing embodiments thereof.

In the figures, parts or elements corresponding or similar to each other are designated by the same reference numeral.

Figure 1:
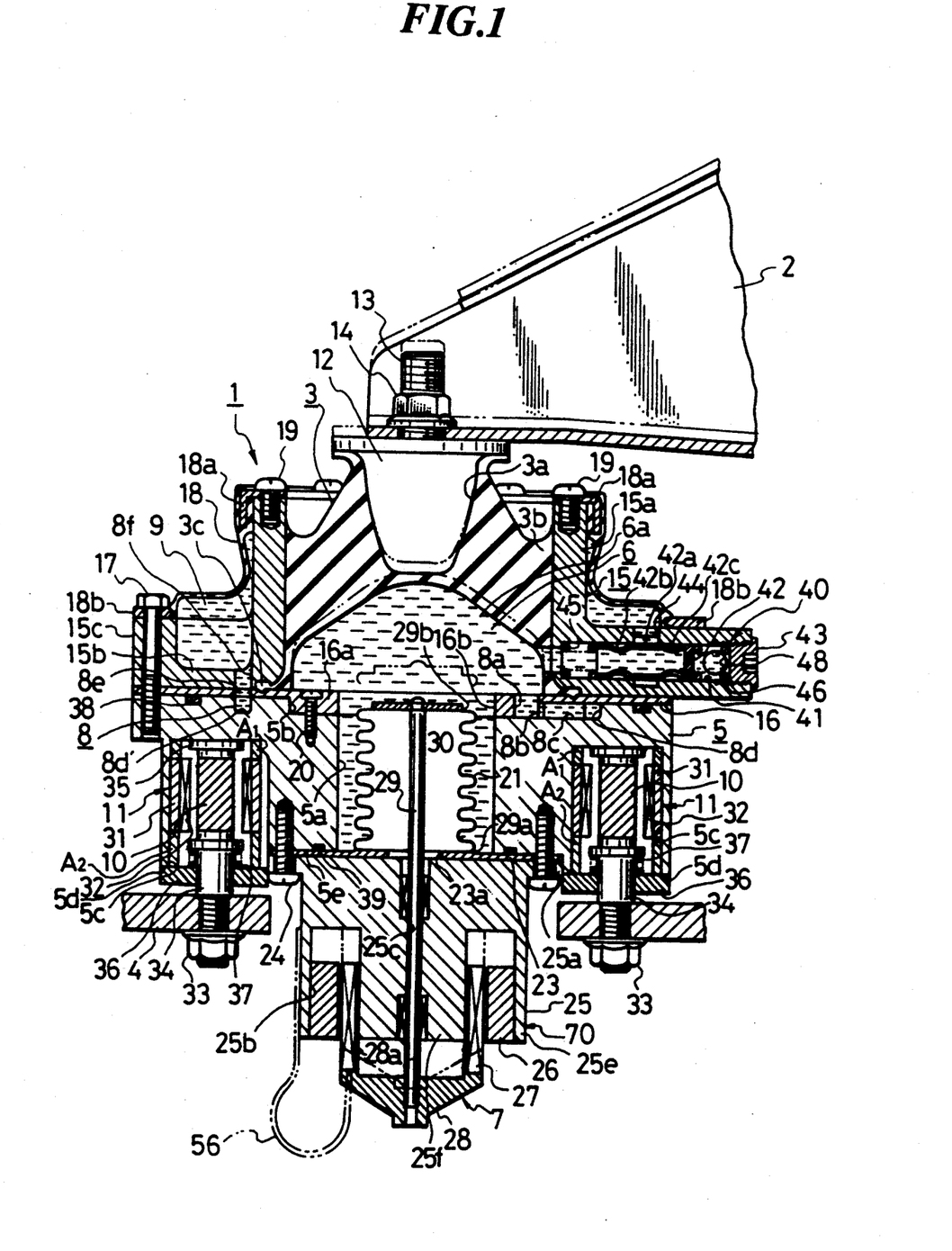
FIG. 1 is a longitudinal cross-sectional view showing a self-expanding mount for an engine, according to a first embodiment of the invention.

FIG. 1 shows a self-expanding engine mount (self-expanding mount) according to a first embodiment of the invention.

Figure 5:
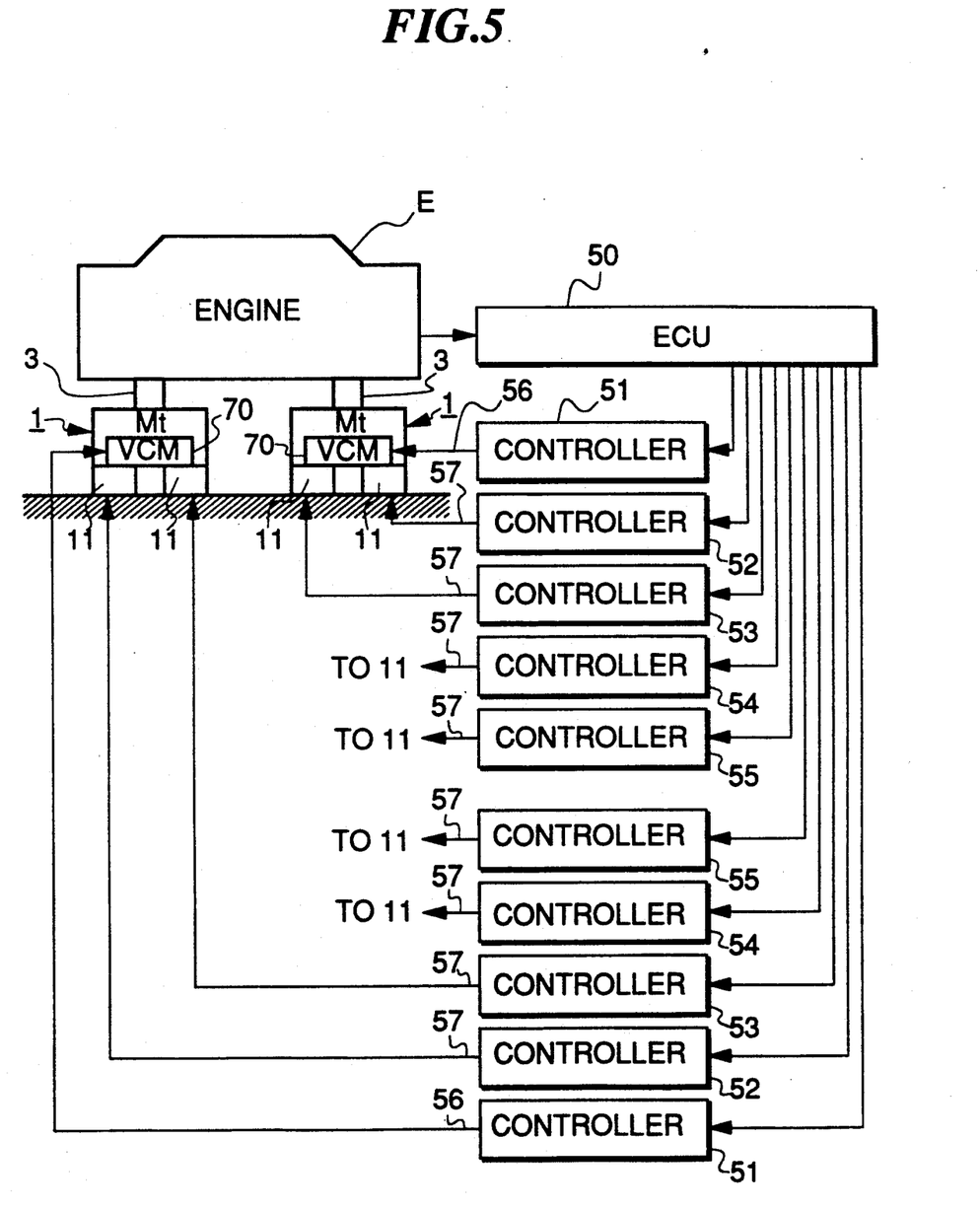
FIG. 5 is a schematic diagram showing the arrangement of a control system for the engine mount of FIG. 1.

The self-expanding engine mount 1 is comprised of a resilient rubber member (resilient member) 3 fixed to a bracket 2 on the engine side, a lower casing 5 arranged on the side of a chassis (base) 4 of a vehicle, a main liquid chamber 6 defined between the resilient rubber member 3 and the lower casing 5 and filled with a liquid (an incompressible fluid such as an antifreeze), liquid pressure-changing means 7 responsive to a control signal supplied from external control means, which is comprised of an electronic control unit (ECU) 50, etc., shown in FIG. 5, hereinafter referred to, and which generates the signal in response to the vibration of the engine (the vibration source), for changing the pressure of the liquid within the main liquid chamber 6, and an auxiliary liquid chamber 9 communicating with the main liquid chamber 6 via a restriction passage 8. Interposed between the chassis 4 and the lower casing 5 are spacing-changing means 11 each having a magnetostrictive element 10 which is resiliently deformed in response to a control signal supplied to the spacing-changing means 11 from the external control means responsive to the engine vibration.

Figure 2:
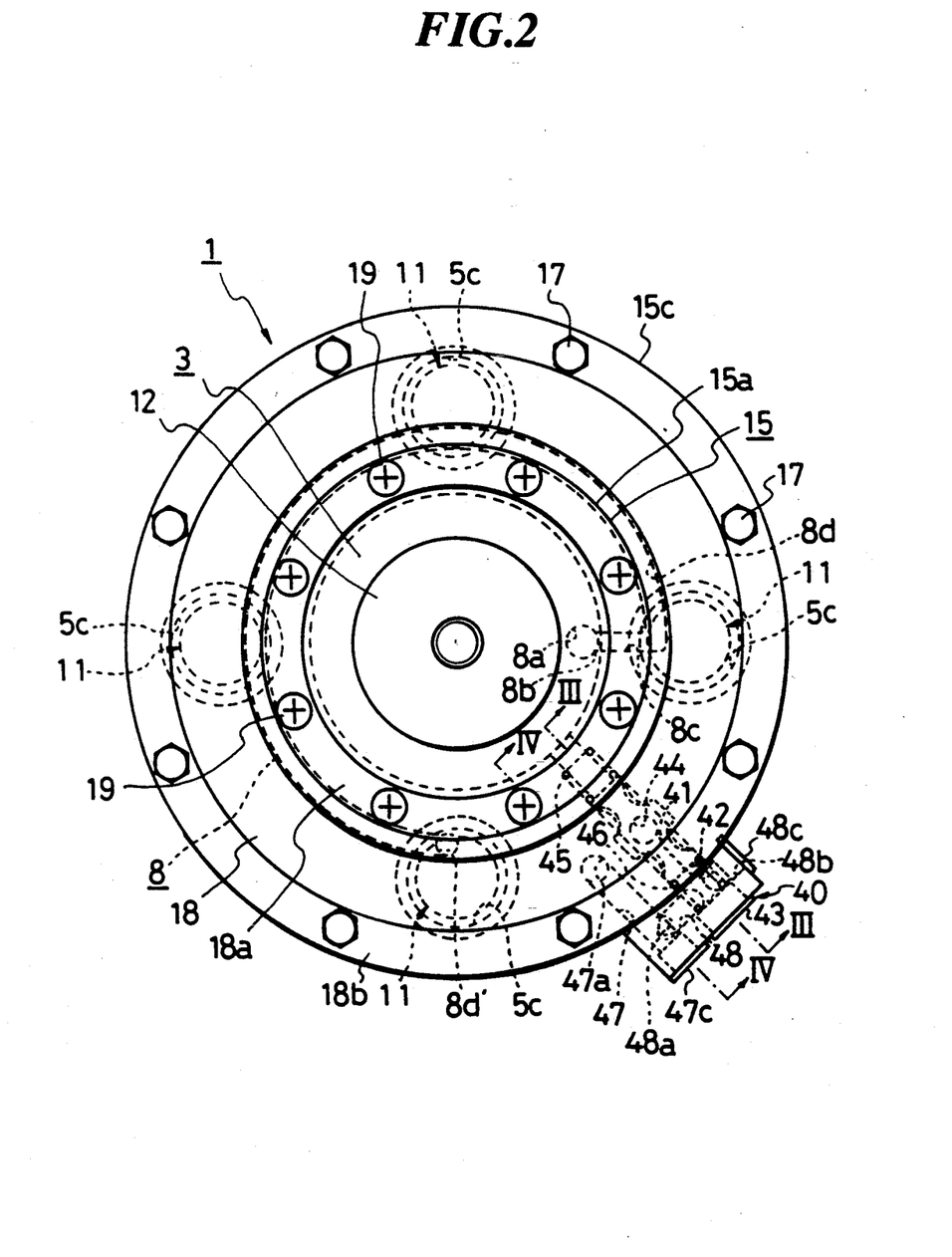
FIG. 2 is a top plan view of the engine mount of FIG. 1.

As shown in FIGS. 1 and 2, the resilient rubber member 3 has a circular section, and has a recess 3a formed in an upper end surface of a central portion thereof. The recess 3a receives a fixture member 12 secured thereto. The fixture member 12 is fastened to the bracket 2 by means of a bolt 13 and a nut 14, thus fixing the central portion of the resilient rubber member 3 to the bracket 2 on the engine side. The resilient rubber member 3 has an outer periphery 3b secured to an inner peripheral surface of a holding wall 15a of an upper casing 15. The outer periphery 3b of the rubber member 3 has a lower end peripheral edge 3c sandwiched between a lower end of the holding wall 15a and a partition plate 16 disposed on the top of the lower casing 5. Thus, the resilient rubber member 3 is supportedly held between the bracket 2 and the upper casing 15, defining an upper space 6a of the main liquid chamber 6 inside the upper casing 15.

The upper casing 15 has a bottom extension 15b and a peripheral wall 15c extending upward continuously from an outer peripheral edge of the bottom extension 15b. The bottom extension 15b has a lower end surface thereof disposed in contact with an upper end surface of the partition plate 16. The peripheral wall 15c is secured via the partition plate 16 to the lower casing 5 by means of a plurality of bolts 17.

The auxiliary liquid chamber 9 is annularly formed between the holding wall 15a and the peripheral wall 15c of the upper casing 15 and defined in part by a diaphragm 18. The diaphragm 18 is in the form of an annular belt, and has a fixture member 18a secured to an inner peripheral edge thereof as well as to an upper end surface of the holding wall 15a by means of a plurality of set screws 19, and a fixture member 18b secured to an outer peripheral edge thereof as well as to an upper end surface of the peripheral wall 15c by means of the aforementioned bolts 17.

As shown in FIGS. 1 and 2, the lower casing 5 is formed therein with a vertically extending central cylindrical space 5a in which a metallic bellows 21 is arranged, an annular recess 5b formed in an upper end surface of the casing 5 concentrically of the space 5a, and four accommodating spaces 5c each accommodating the spacing-changing means 11 and located radially outward of the cylindrical space 5a and at circumferential intervals of approx. 90 degrees. Each accommodating space 5c has an open lower end 5d thereof located at a level lower than a central lower end surface 5e of the casing 5 in which the cylindrical space 5a opens.

The partition plate 16 has an annular thick portion 16a fitted in the recess 5b of the lower casing 5, the thick portion 16a being formed therein of the cylindrical space 5a. The partition plate 16 is secured to the upper end surface of the lower casing 5 at the thick portion 16a by means of set screws 20.

As shown in FIGS. 1 and 2, the restriction passage 8 is formed by a through bore 8a axially extending through the thick portion 16a of the partition plate 16, a bore 8b radially extending from the through bore 8a to an outer peripheral surface of the thick portion 16a, a straight groove 8c communicating with the bore 8b and radially extending below the partition plate 18 from the bore 8b to a location corresponding to the bottom of the auxiliary liquid chamber 9, an annular groove 8d circumferentially extending below the partition plate 16 through approx. 270 degrees from a radially outer end of the communicating groove 8c to a terminal end 8d' thereof, and through bores 8e and 8f respectively formed through the partition plate 16 and the bottom extension 15b of the upper casing 15 to communicate between the terminal end 8d' and the auxiliary liquid chamber 9.

The resonance frequency of the restriction passage 8, which depends on the cross-sectional area and length of the passage, is set to a very low value (e.g. 7 Hz) lower than a basic vibration frequency (approx. 10 Hz to approx. 100 Hz) of the engine. This enables the liquid to flow via the restriction passage 8 between the main liquid chamber 6 and the auxiliary liquid chamber 9 to thereby keep the pressure within the main liquid chamber 6 substantially constant, only when static pressure is applied to the mount 1 on which the engine as the vibration source is mounted, or when engine vibration occurs, which has a very low vibration frequency, whereby the metallic bellows 21 arranged within the main liquid chamber 6 is held in a neutral position as shown in FIG. 1. On the other hand, when the engine vibration has a higher frequency than the above-mentioned very low value, the restriction passage 8 acts to prevent the liquid from flowing between the main liquid chamber 6 and the auxiliary liquid chamber 9 in response to the vibration of the engine, thus confining variation in the liquid pressure to the inside of the main liquid chamber 6.

As shown in FIG. 1, the liquid pressure-changing means 7 is comprised of the aforementioned metallic bellows 21 as a driven member, which is arranged within the cylindrical space 5a of the lower casing 5, and a voice coil motor (hereinafter simply referred to as "VCM") 70 as electromagnetic driving means for driving the metallic bellows 21.

The VCM 70 has a body 25 arranged on the bottom of the lower casing 5. The body 25 is fixed to the central lower end surface 5e of the lower casing 5 via a partition plate 23, and has an annular space 25b formed in an outer periphery thereof and axially extending from an axially intermediate portion of the body 25 to a lower end face of the body 25. Further, the VCM 70 has an annular permanent magnet 26 secured to an outer wall 25e defining the annular space 25b, a driving element 28 having a bobbin 28a in the form of a hollow cylinder and slidably fitted on an inner wall 25f defining the space 25b such that it can move within the magnetic field generated by the permanent magnet 26, the bobbin 28a having a coil 27 wound around an outer peripheral surface thereof, and a rod 29 slidably fitted through a central through hole 25c axially extending along the axis of the body 25 for transmitting the displacement of the driving element 28 to the metallic bellows 21. The metallic bellows 21 has a lower end 29a thereof secured to an upper end surface of the partition plate 23, and an upper end 29b thereof secured to a lower end surface of a presser plate 30 fixed to an upper end of the rod 29. The partition plate 23 has a central hole 23a formed therethrough for allowing the rod 29 to move therethrough. The central hole 23a has a diameter much smaller than the diametric size of the metallic bellows 21. Thus, the main liquid chamber 6 is defined by the resilient rubber member 3, an inner peripheral surface of the casing 5 defining the cylindrical space 5a, and the partition plate 23.

The VCM 70 having the above described construction operates in such a manner that the coil 27, which is disposed within the magnetic field generated by the permanent magnet 26, is supplied with a control current from the external control means, which is responsive to the engine vibration, so that an electromagnetic driving force is generated in the coil 27 to thereby cause the driving element 28 to be displaced axially of the cylindrical space 5a, in an oscillating manner. This oscillating displacement of the driving element 28 is transmitted via the rod 29 to the metallic bellows 21 to cause same to expand and contract within the main liquid chamber 6, which causes a variation in the liquid pressure within the main liquid chamber 6. When the VCM 70 does not generate any driving force, the metallic bellows 21 is in its neutral position as shown in FIG. 1 due to its own restitution force. Further, when the metallic bellows 21 is extended upward from its neutral position to the highest position, the upper end thereof moves into the upper space 6a of the main liquid chamber 6. The bellows 21 is designed such that its vertical or longitudinal size is substantially larger than its diametrical size, i.e. it is shaped such that it affords a large amount of axial displacement and has a small effective surface area.

Each of the spacing-changing means 11 arranged respectively in the four accommodating spaces 5c of the lower casing 5 is comprised of the aforementioned magnetostrictive element 10, a biasing permanent magnet 31 in the form of a hollow cylinder disposed around the magnetostrictive element 10 and in contact with an inner peripheral surface of the lower casing 5 defining the accommodating space 5c, and a coil 32 supportedly wound on and along an inner peripheral surface of the permanent magnet 31 in spaced relation to the magnetostrictive element 10. The magnetostrictive element 10 is supportedly interposed between an upper end surface of a holding member 34 fixed to the chassis 4 by means of a bolt 33 and a holding member 35 secured to an upper end surface of the accommodating space 5c. The holding member 34 has a shaft which is slidably fitted through a hole formed through a cap 36 secured to an open end 5d of the accommodating space 5c, and a radial flange formed at an upper end thereof and holding a spring 37 between the flange and an inner end surface of the cap 36. The permanent magnet 31 is held between an upper spacer $A_1$ and a lower spacer $A_2$. The magnetostrictive element 10 is permanently biased by the magnetic field generated by the permanent magnet 31 (i.e. resiliently predeformed by the magnetic field). When the coil 32 is supplied from the external control means with a control signal or control current to generate a magnetic field, the magnetostrictive element 30 is further resiliently deformed from its original predeformed state, i.e. contracts and expands, in response to the intensity of the magnetic filed generated by the coil 32 The resulting contraction and expansion of the magnetostrictive element 30 causes a variation in the spacing between the lower casing 5 of the mount 1 and the chassis 4. In addition, since the magnetostrictive element 10 is biased by the permanent magnet 31, the control current to be supplied to the coil 32 can be reduced, saving the electric power.

Figure 3:
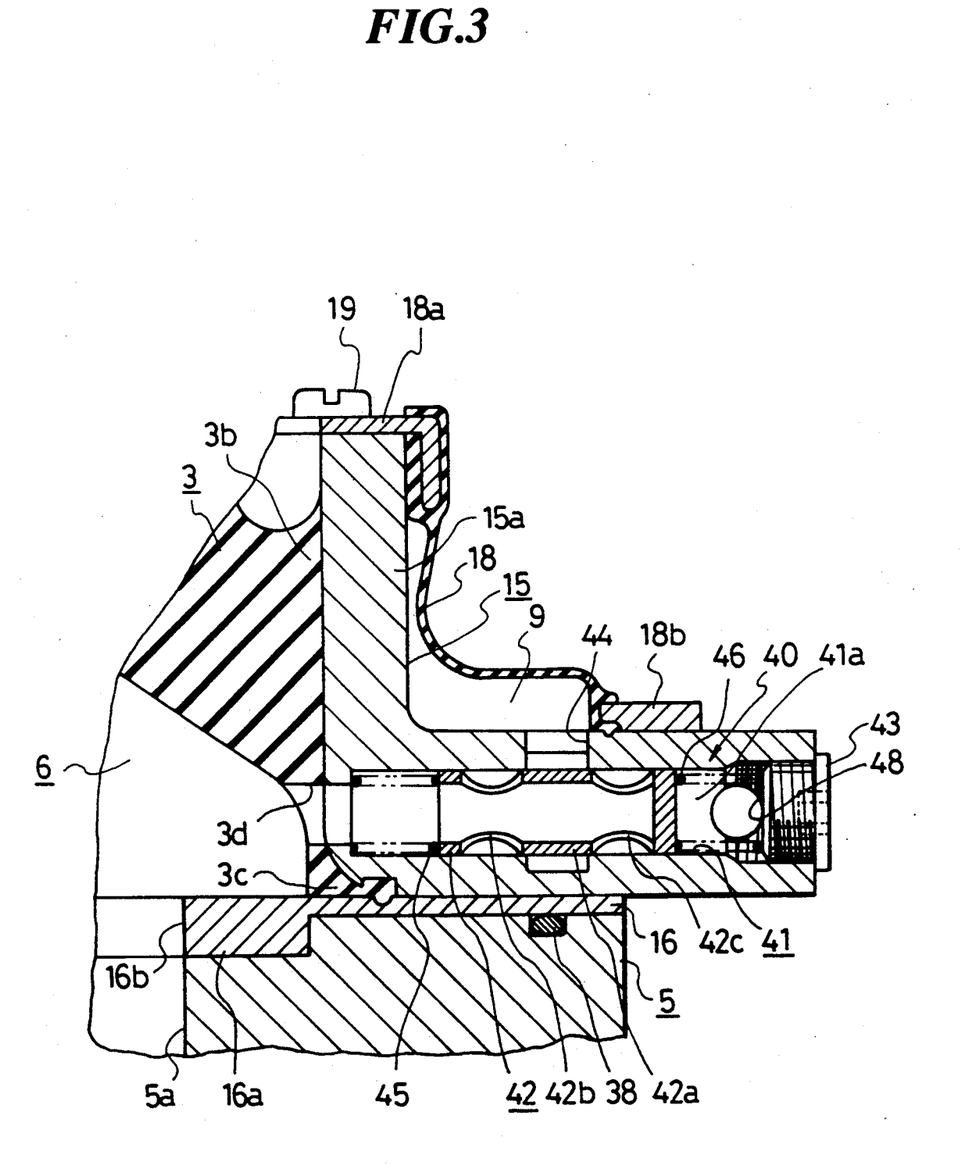
FIG. 3 is a sectional view taken along line III—III in FIG. 2.

Further, as shown in FIGS. 1 and 3, the upper casing 15 is provided with a pressure-relieving mechanism 40. The pressure-relieving mechanism 40 includes a horizontally-extending main bore 41 formed in the upper casing 15, and a valving element 42 slidably fitted in the main bore 41. The main bore 41 has one end thereof communicating with the main liquid chamber 6 via a communicating hole 3d formed through a lower end portion of the outer periphery 3b of the resilient rubber member 3, an opposite open end thereof closed by a blank plug 43 screwed therein, and an intermediate portion thereof communicating with the auxiliary liquid chamber 9 via a communicating hole 44. The valving element 42 is in the form of a hollow cylinder having an open end on the main liquid chamber 6 side and a closed end on the blank plug 43 side. The valving element 42 has an intermediate portion thereof formed with a closing portion 42a which has a width sufficient to close the communicating hole 44, and communicating openings 42b, 42c on opposite sides of the closing portion 42a. Arranged on opposite sides of the valving element are a pair of springs 45, 46 urging the valving element toward a neutral position (as shown in FIG. 3) in which the closing portion 42a closes the communicating hole 44.

Figure 4:
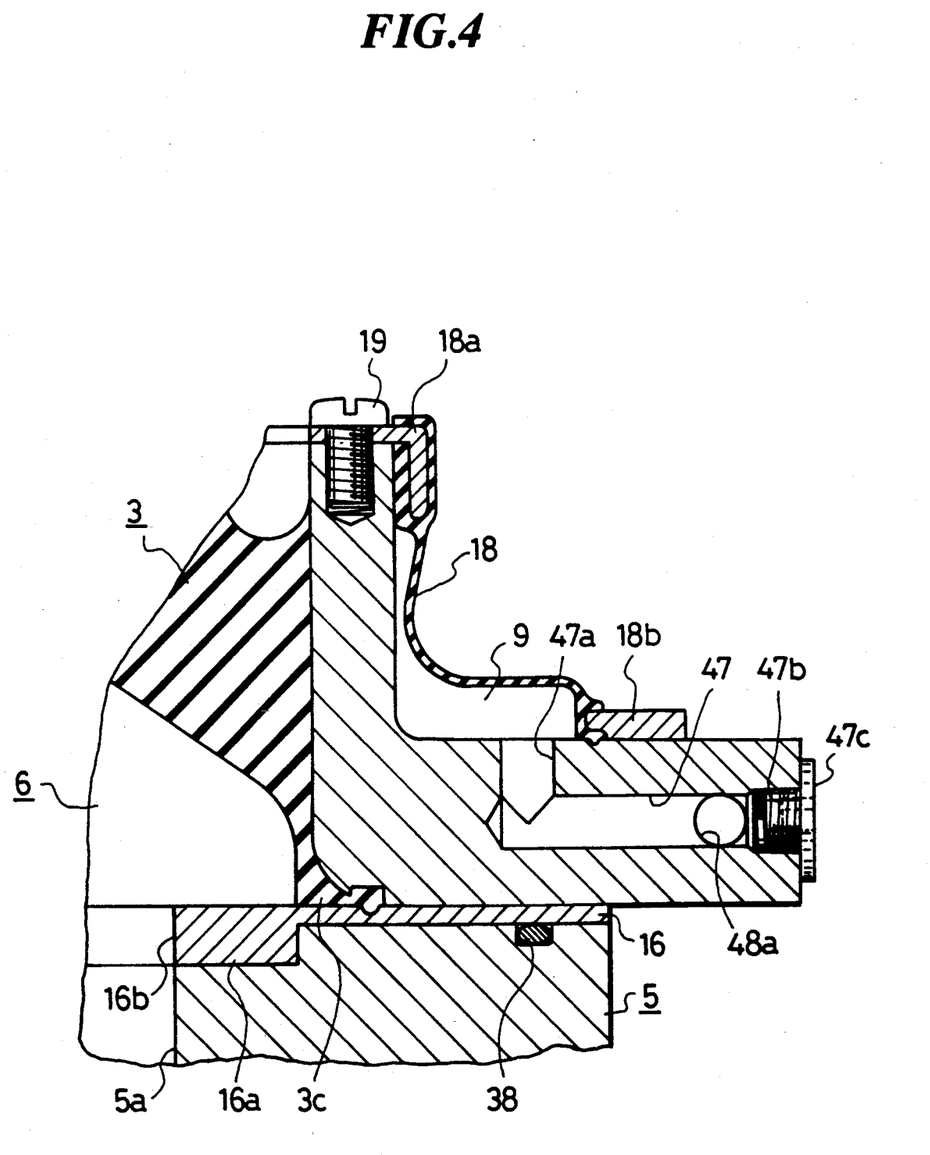
FIG. 4 is a sectional view taken along line IV—IV in FIG. 2.

Further, the pressure-relieving mechanism 40 has a communicating passage communicating between a space 41a defined within the main bore 41 by the closed end of the valving element 42 and the blank plug 43 screwed into the open end of the main bore 41, and the auxiliary liquid chamber 9, to prevent the valving element 42 from becoming inoperative due to liquid tightly held within the space 41a. As shown in FIGS. 2 to 4, the communicating passage is comprised of a communicating hole 47 extending substantially parallel with the main hole 41, and a communicating hole 48 communicating between the communicating hole 47 and the space 41a. The communicating hole 47 has one end 47a opening into the auxiliary liquid chamber 9 and the other end 47b closed by a blank plug 47c. Further, the communicating hole 48 has one end 48a opening into the communicating hole 47 and an opposite open end 48b closed by a blank plug 48c.

The self-expanding engine mounts 1 constructed as above are arranged, e.g. as shown in FIG. 5, in front and rear portions of the engine E in a power unit to support the front and rear portions of the engine E on the chassis 4. The engine mounts 1 each have the VCM 70, and the spacing-changing means 11 interposed between the lower casing 5 and the chassis 4. The coil 27 of the VCM 70 of each engine mount 1 is supplied with a control signal current via a lead 56 from a controller 56, as shown in FIGS. 1 and 5. Further, the coils 32 of the four spacing-changing means 11 of each engine mount 1 are supplied with control signal currents via leads 57 from controllers 52 to 55, respectively, as shown in FIG. 5, whereby the four spacing-changing means 11 are controlled independently of each other. Inputs of the controllers 51 to 55 are connected to an output of the aforementioned electronic control unit (hereinafter referred to as "the ECU") 50. The ECU 50 is supplied from the engine E with various parameter signals related to the vibration of the engine, such as a signal indicative of the engine rotational speed, based on which the ECU 5 supplies control commands to the controllers 51 to 55 in response to the engine vibration. More specifically, the ECU 50 supplies each controller 51 with a control command for controlling the engine vibration in a low frequency range from approx. 10 Hz to approx. 100 Hz, while it supplies the controllers 52 to 55 with control commands for controlling the vibration in a high frequency range higher than 100 Hz, which vibration cannot be controlled by the liquid pressure-changing means 7 provided with the VCM 70.

Further, as shown in FIG. 1, an O ring 38 is mounted in the upper end surface of the lower casing 5 to seal between contact surfaces of the lower casing 5 and the partition plate 16, at a location radially outward of the annular groove 8d of the restriction passage 8. Further, an O ring 39 is mounted in the lower end surface of the lower casing 5 to seal between contact surfaces of the lower casing 5 and the partition plate 23, at a location radially outward of the cylindrical space 5a.

Next, the operation of the self-expanding engine mount 1 constructed as above according to the first embodiment will be described.

When the ECU 50 detects the engine vibration in a low frequency range from approx. 10 Hz to approx. 100 Hz, the ECU 50 supplies a control command for controlling the engine vibration in this frequency range to each controller 51, which in turn supplies a control signal current commensurate with the control command to the coil 27 of the VCM 70 of each engine mount. Accordingly, the driving element 28 of each VCM 70 is alternately displaced upward and downward by a magnetic driving force generated within the coil 27, as the latter is energized and deenergized, in the magnetic field formed by the permanent magnet 26, by the control signal current. The oscillating displacement of the driving element is transmitted via the rod 29 to the metallic bellows 21 to cause contraction and expansion of the bellows 21 within the main liquid chamber 6. The contraction and expansion of the bellows 21 causes a variation in the pressure of the liquid within the main liquid chamber 6 to thereby resiliently deform the resilient rubber member 3 upward and downward to expand and contract same. The direction of this deformation of the resilient rubber member 3 is such that when the engine E presses down the mount 1 or the resilient rubber member 3, the latter is resiliently deformed downward to contract, whereas when the engine E pulls up the mount 1 or the resilient rubber member 3, the resilient rubber member 3 is resiliently deformed upward to expand. Thus, the contraction and expansion of the resilient rubber member 3 prevents the engine vibration in the aforementioned low frequency range from being transmitted to the chassis 4.

When the ECU 60 detects the engine vibration in a high frequency range higher than 100 Hz, the ECU 50 supplies control commands for controlling the engine vibration in this range to the controllers 52 to 55, which in turn separately supply control signal currents commensurate with the control commands to the coils 32 of the four spacing-changing means 11 of each engine mount 1. Accordingly, the magnetostrictive element 10 of each spacing-changing means 11 is resiliently deformed in the vertical direction, i.e. contracts and expands, from its original predeformed state, in response to the intensity of the magnetic field generated by energization of the coil 32 by a control signal current supplied thereto. The direction of this deformation is such that when the engine E presses down the mount 1, i.e. when it acts to reduce the spacing between the mount 1 and the chassis 4, the magnetostrictive element 10 contracts to thereby reduce the spacing between the chassis 4 and the lower casing 5, whereas when the engine E pulls up the mount 1, i.e. when it acts to increase the spacing between the mount 1 and the chassis 4, the magnetostrictive element 10 expands to thereby increase the spacing. Thus, the contraction and expansion of the magnetostrictive element 10 prevents the engine vibration in the high frequency range from being transmitted to the chassis 4.

As described heretofore, in the liquid pressure-changing means 7 having the VCM 70, the driving element 28 can be largely reciprocatively displaced, but there exists a significant time lag between the time point of inputting of the control signal current to the coil 27 and the time point of actual contraction and expansion of the resilient rubber member 3. Therefore, the liquid pressure-changing means 7 is used for preventing transmission of the engine vibration in the low frequency range of approx. 10 Hz to approx. 100 Hz to the chassis. In contrast, in the case of the spacing-changing means 11, the magnetostrictive element 10 effects smaller amounts of displacement, but the magnetostrictive element 10 has a neglizible time lag between the time point of inputting the control signal current to the coil 32 and the time point of actual deformation of the magnetostrictive element 10. Therefore, the spacing-changing means 11 is used for preventing transmission of the engine vibration in the high frequency range higher than 100 Hz to the chassis. Thus, according to the engine mount 1 of the present embodiment, the liquid pressure-changing means 7 and the spacing-changing means 11 having different operating characteristics are used in combination, which enables to accurately control the vibration of the engine over a wide frequency range from a low frequency region to a high frequency region, thereby effectively preventing transmission of the vibration of the chassis over a wide frequency range to the chassis.

Further, according to the first embodiment described above, the four spacing-changing means 11 are arranged at horizontally different locations between the lower casing 5 and the chassis 4, and at the same time the spacing-changing means 11 are controlled independently of each other, which enables to control the engine vibration even in rolling directions.

Further, according to the first embodiment, by virtue of the pressure-relieving mechanism 10, when the liquid pressure within the main liquid chamber 6 is pressurized above a predetermined value, the valving element 42 of the pressure-relieving mechanism 40 is displaced rightward from its neutral position shown in FIGS. 1 and 3, as viewed in the figures, to allow the communicating hole 42b to communicate with the communicating hole 44, whereby liquid flows or escapes from the main liquid chamber 6 via the communicating hole 3d, the main bore 41, the inside of the valving element 42, the communicating hole 42b of the valving element 42, and the communicating hole 44, into the auxiliary liquid chamber 9, which enables to prevent an excessive change in the pressure within the main liquid chamber 6. The liquid having flowed into the auxiliary liquid chamber 9 is returned to the main liquid chamber 6 by the restitution force of the diaphragm 18, after the valving element 42 has returned to its neutral position shown in FIG. 1, which enables to maintain the pressure within the main liquid chamber 6 at a substantially constant value. This holds the metallic bellows 21 in its neutral position shown in FIG. 1.

Conversely, when the liquid pressure within the main liquid chamber 6 is negatively pressurized below a predetermined value, the valving element 42 of the pressure-relieving mechanism 40 is displaced from its neutral position in the leftward direction as viewed in FIGS. 1 and 3 to allow the communicating hole 42c to communicate with the communicating hole 44, so that fluid flows from the auxiliary liquid chamber 9 via the communication holes 44, 42c, the inside of the valving element 42, the main bore 41 and the communicating hole 3d. into the main liquid chamber 6, which enables to prevent an excessive change in the liquid pressure within the main liquid chamber 6. In this case as well, the liquid having flowed into the main liquid chamber 6 is returned via the restriction passage 8 to the auxiliary liquid chamber 9 by the restitution force of the diaphragm 18, after the valving element 4 has returned to its neutral position, which enables to maintain the pressure within the main liquid chamber 6 at a substantially constant value. This holds the metallic bellows 21 in its neutral position shown.

Although in the first embodiment described above, the four spacing-changing means 11 are arranged at the respective locations between the lower casing 5 and the chassis 4, the number of spacing-changing means 11 provided at respective offset locations may be two or more to achieve the desired end of the invention.

Further, the spacing-changing means 11 may employ an electrostrictive element which is resiliently deformed in response to voltage applied from the external control means, in stead of current.

Figure 6:
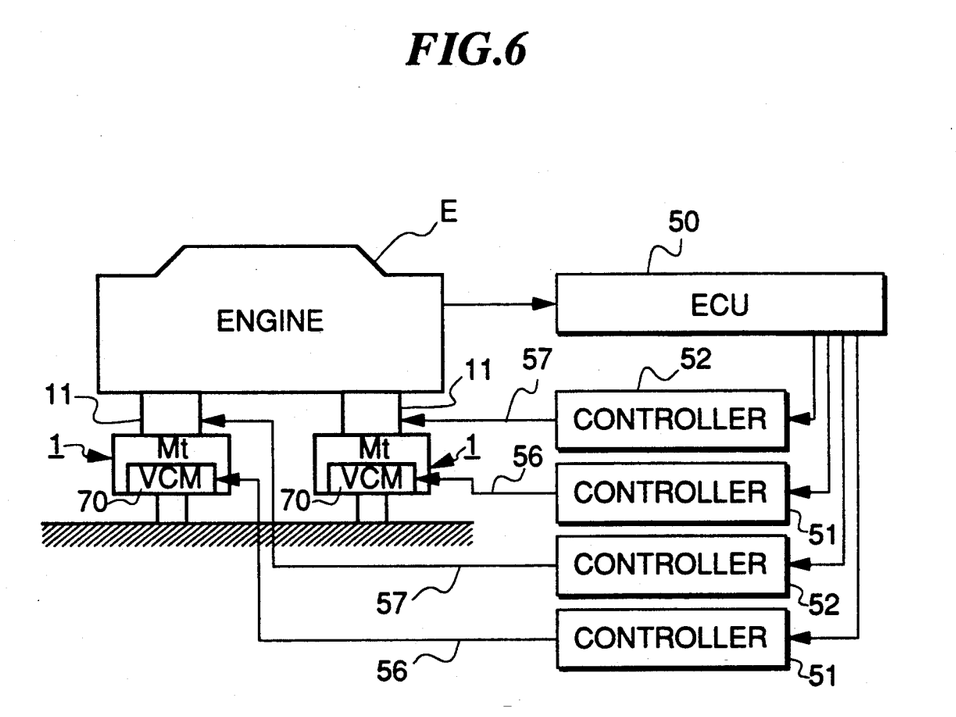
FIG. 6 is a schematic diagram showing the arrangement of a control system for a self-expanding mount for an engine, according to a second embodiment of the invention.

Next, a second embodiment of the invention will be described with reference to FIG. 6.

The self-expanding engine mount 1 according to the second embodiment is mainly distinguished from the first embodiment described above in that single spacing-changing means 11 is arranged in the fixture member 12 secured to the resilient rubber member 3. More specifically, in each engine mount 1, one spacing-changing means 11 is provided between the bracket (vibration source) 2 on the power unit side and the resilient rubber member 3. The engine mounts I are arranged, as shown in FIG. 6, at the front and rear portions of the engine E in the power unit, for supporting the front and rear portions of the engine E om the chassis (base) 4. The coil 27 of the VCM 70 of each engine mount 1 is supplied with a control signal current from each controller 51 via a lead 56. Further, the coil 32 of the spacing-changing means 11 of each engine mount 1 is supplied with a control signal current from each controller 52 via a lead 57.

Next, a third embodiment of the invention will be described with reference to FIGS. 7 and 8.

The self-expanding engine mount 1 according to the third embodiment is constructed such that the driving element per se of the VCM 70 as part of the liquid pressure-changing means 7 is axially displaced in a vibrating manner within the cylindrical space 5a.

Figure 7:
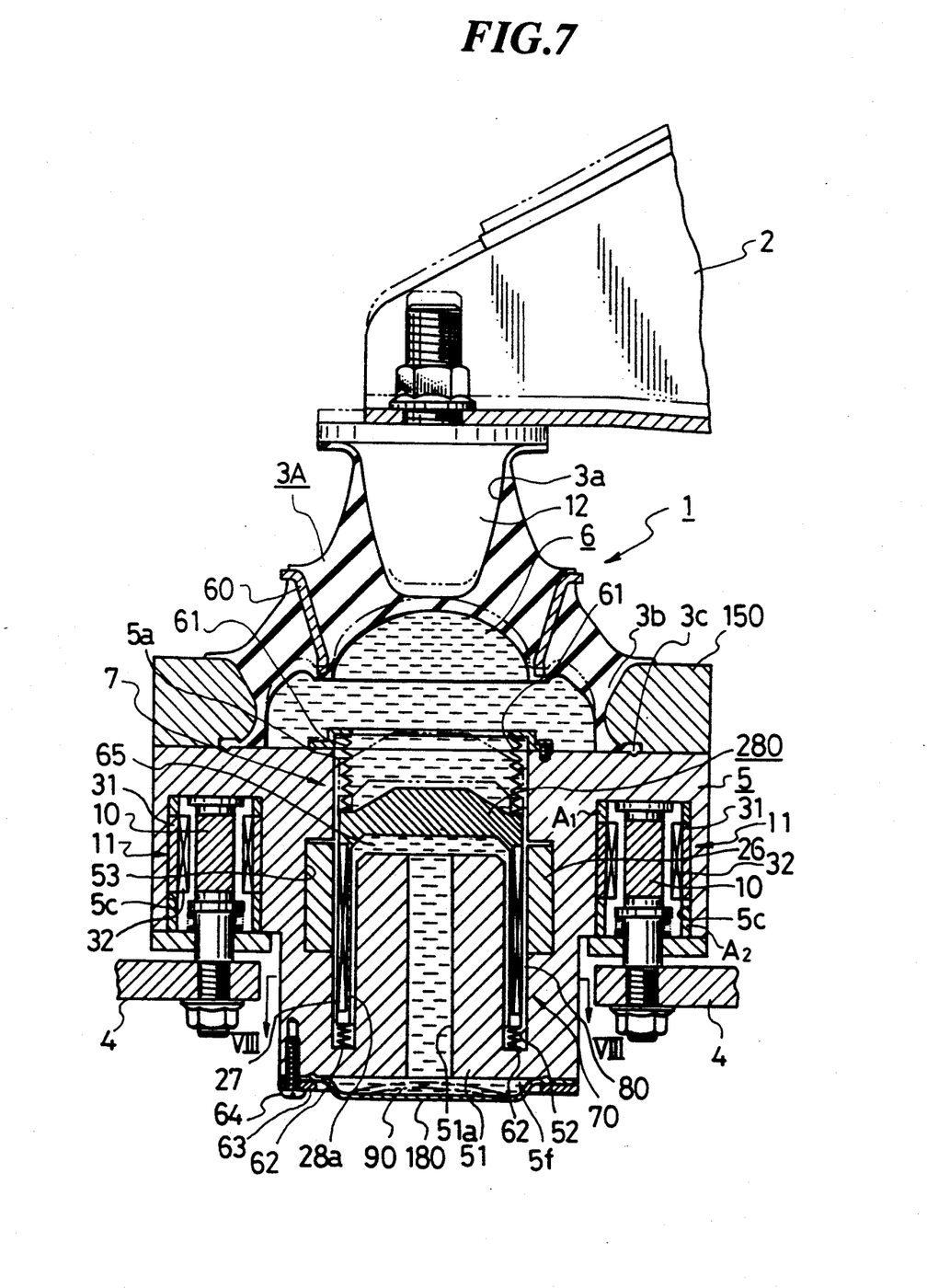
FIG. 7 is a longitudinal cross-sectional view showing a self-expanding mount for an engine according to a third embodiment of the invention.

As shown in FIG. 7, an outer periphery 3b of a resilient rubber member 3A used in this embodiment is secured to an inner peripheral surface of an annular fixture member 150. The fixture member 150 is fixed to the lower casing 5 by means of a plurality of bolts, not shown, with a lower end 3c of the outer periphery 3b being sandwiched between an inner lower end portion of the fixture member 150 and an upper end surface of the lower casing 5. The resilient rubber member 3A is designed such that it is larger in radius than the resilient rubber member 3 of the above described embodiments, and hence it affords a larger amount of contraction or expansion in response to variation in the liquid pressure within the main liquid chamber 6. Further, to compensate for reduced strength thereof due to the increased radius, an annular reinforcing member 60 is embedded in an radially intermediate portion of the resilient rubber member 3A.

Figure 8:
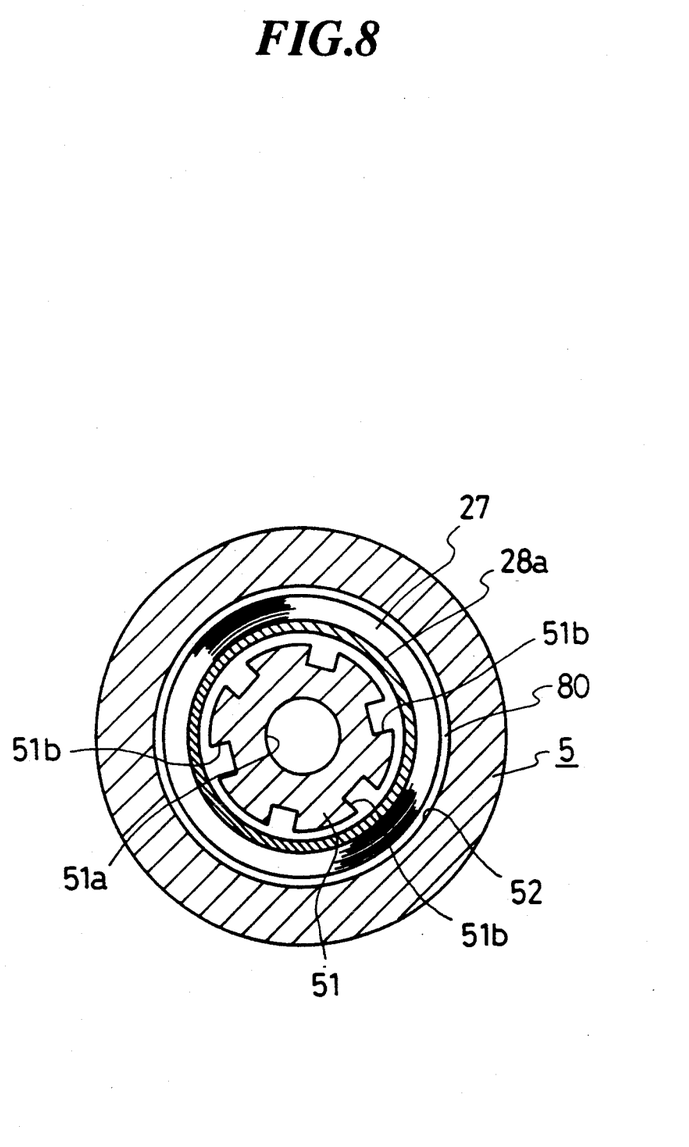
FIG. 8 is a sectional view taken along line VIII—VIII in FIG. 7.

As shown in FIGS. 7 and 8, a hollow cylinder 51 is formed within the cylindrical space 5a of the lower casing 5. Defined between the hollow cylinder 51 and the wall defining the cylindrical space 5a is an annular space 52 which is closed at the bottom and communicates with the main liquid chamber 6 via an open end thereof. Further, the hollow cylinder 51 has a central through hole 51a axially formed therethrough, and a plurality of axially-extending deep grooves 51b formed in an outer peripheral surface thereof.

The VCM 70 constituting the liquid pressure-changing means 7 is comprised of an annular permanent magnet 26 securedly fitted in an annular groove 53 formed in an inner peripheral wall of the casing 5 defining the cylindrical space 5a, and a piston 280 as a driving element having a bobbin 28a in the form of a hollow cylinder integrally formed thereon and slidably received in the annular space 52, and a coil 27 wound around an outer peripheral surface of the bobbin 28a.

The piston 280 is normally held in a neutral position, while floating within the main liquid chamber 6, by springs 61, 62 arranged on the upper and lower ends thereof, respectively, for urgingly holding the piston 280 in the neutral position. FIG. 7 shows the lowest position of the piston 280, in which the lower spring 62 is compressed to the maximum degree.

Further, an auxiliary liquid chamber 90 is defined between a lower end surface 5f of the lower casing 6 and a diaphragm 180. The diaphragm 180 has a peripheral edge thereof sandwiched between an annular fixture member 63 and the lower end surface 5f of the lower casing 5 and secured to the lower casing 5 by a plurality of set screws 64. The auxiliary liquid chamber 90 communicates with the main liquid chamber 6 via a communication passage formed of the central through hole 51a of the hollow cylinder 51, a space 65 defined between an upper end of the hollow cylinder 51 and the piston 280, a space defined between the outer peripheral surface of the hollow cylinder 51 and the bobbin 28a, and a space 80 defined between an outer peripheral surface of the coil 27 and the wall of the casing 5 defining the cylindrical space 5a. The space 80 corresponds to the restriction passage 8 of the first embodiment.

With the above arrangement according to the third embodiment, the piston 280 is displaced upward and downward in an oscillating manner by a magnetic driving force generated in the coil 27 disposed in the magnetic field of the permanent magnet 26 in response to a control signal current supplied thereto. The displacement of the piston 280 causes a change in the liquid pressure within the main liquid chamber 6, to thereby cause upward and downward deformation of the resilient rubber member 3A for contraction and expansion. This contraction and expansion corresponding to engine vibration prevents transmission of the engine vibration to the chassis.

According to the third embodiment, similarly to the first embodiment, the spacing-changing means 11 controls the engine vibration in the high frequency range higher than 100 Hz, while the liquid pressure-changing means 7 controls the engine vibration in the low frequency range of approx. 10 Hz to approx. 100 Hz. This enables to accurately control the engine vibration over a wide frequency range from a low frequency region to a high frequency region, thereby preventing transmission of the engine vibration over the wide frequency range.

Further, according to the third embodiment, the piston 280 per se forms a driving element of the VCM 70 as part of the liquid pressure-changing means 7 and is adapted to be displaced in an oscillating manner within the cylindrical space 5a. Therefore, it dispenses with the driving element 28 of the VCM 70, the metallic bellows 21, the rod 29 connecting the driving element 28 to the metallic bellows 21, and other members associated therewith, which are employed in the first embodiment. This simplified construction of the liquid pressure-changing mechanism enables to reduce the number of component parts, saving the manufacturing cost, and reduce the total size and weight of the liquid pressure-changing means 7, which in turn enables to reduce the amount of the control signal current inputted to the coil 27 for driving the piston 280 as the driving element, thus saving the electric power. The reduction of the total mass of the liquid pressure-changing means 7 contributes to reducing the total weight of the engine mount 1.

Further, since the whole liquid pressure-changing means 7 is accommodated within the lower casing 5, the vertical size of the engine mount 1 is reduced to make the whole mount 1 compact in size, reducing the total space occupied by the engine mount 1.

The reduction of the total mass of the engine mount 1 and the total space occupied by same leads to improvement of the mountability of the engine mount 1 onto the vehicle.

Further, according to the third embodiment, the spacing 80 forms a restriction corresponding to the restriction passage 8 of the first embodiment. Therefore, it is not necessary to provide a special path which serves as restricting means for restricting the flow of liquid, i.e. the restriction passage 8, as in the first embodiment, which enables to simplify the machining operation, as well as to simplify the construction, and reduce the total space occupied by the mount 1 and the mass of same.

What is claimed is:

1. In a self-expanding mount for controlling transmission of vibration of a vibration source to a base, including a resilient member fixed to one of said vibration source and said base, a casing fixed to the other of said vibration source and said base, a main liquid chamber defined between said resilient member and said casing and filled with liquid, liquid pressure-changing means for changing pressure of said liquid within said main liquid chamber in response to a first control signal corresponding to vibration of said vibration source, an auxiliary liquid chamber, and a communication passage having a restriction and communicating said auxiliary liquid chamber with said main liquid chamber, wherein a variation in pressure of said liquid is caused by said liquid pressure-changing means to cause contraction and expansion of said resilient member to thereby control the transmission of vibration of said vibration source to said base,     the improvement comprising spacing-changing means for changing spacing between said vibration source and said base, said spacing-changing means having an element resiliently deformable in response to a second control signal corresponding to said vibration of said vibration source.

2. A self-expanding mount according to claim 1, wherein said spacing-changing means is interposed between said vibration source and said resilient member for changing spacing between said vibration source and said resilient member.

3. A self-expanding mount according to claim 1, wherein said spacing-changing means is interposed between said base and said casing for changing spacing between said base and said casing.

4. A self-expanding mount according to claim 1, said mount being disposed normally to the horizontal, and including a plurality of said spacing-changing means, said spacing-changing means being arranged at horizontally different locations, each of said spacing-changing means being controlled by said second control signal separately and independently of each other.

5. A self-expanding mount according to claim 1, wherein said element is a magnetostrictive element.

6. A self-expanding mount according to claim 5, wherein said spacing-changing means includes a coil disposed to be supplied with a current as said second control signal, said coil generating a magnetic field when energized by said current.

7. A self-expanding mount according to claim 6, wherein said spacing-changing means includes a permanent magnet which permanently deforms said magnetostrictive element.

8. A self-expanding mount according to claim 1, wherein said element is an electrostrictive element.

9. A self-expanding mount according to any of claims 1 to 8, wherein said element is resiliently deformed by said second control signal at a frequency higher than a frequency at which the pressure of said liquid is varied in response to said first control signal.

10. A self-expanding mount according to claim 9, wherein said element contracts and expands in response to said second control signal.

* * * * *